(12) United States Patent
Li

(10) Patent No.: US 9,506,600 B1
(45) Date of Patent: Nov. 29, 2016

(54) GUIDE RAIL FOR SOLAR MOUNTING

(71) Applicant: Jiangsu Chiko Solar Co., Ltd., Suqian, Jiangsu (CN)

(72) Inventor: Jinbei Li, Jiangsu (CN)

(73) Assignee: JIANGSU CHIKO SOLAR CO., LTD., Suqian (CN)

( * ) Notice: Subject to any disclaimer, the term of this patent is extended or adjusted under 35 U.S.C. 154(b) by 0 days.

(21) Appl. No.: 14/827,340

(22) Filed: Aug. 17, 2015

(30) Foreign Application Priority Data

Jul. 1, 2015 (CN) .......................... 2015 1 0379785

(51) Int. Cl.
*A47G 1/10* (2006.01)
*F16M 13/02* (2006.01)

(52) U.S. Cl.
CPC ..................................... *F16M 13/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,928,512 A * | 3/1960 | Slater | .................... | A47B 57/565 248/243 |
| D378,047 S * | 2/1997 | Chudoba | ........................ | D8/354 |
| D627,717 S * | 11/2010 | Munoz | .......................... | D13/102 |
| 7,987,641 B2 * | 8/2011 | Cinnamon | .............. | F24J 2/5211 52/173.3 |
| 8,250,829 B2 * | 8/2012 | McPheeters | ........ | E04D 13/1476 136/244 |
| 8,387,319 B1 * | 3/2013 | Gilles-Gagnon | ...... | F24J 2/5205 52/173.3 |
| 8,407,895 B2 * | 4/2013 | Hartelius | ................ | F24J 2/5232 248/309.1 |
| 8,430,372 B2 * | 4/2013 | Haddock | .............. | E04F 13/0821 248/500 |
| 8,505,864 B1 * | 8/2013 | Taylor | ..................... | F24J 2/5258 248/226.12 |
| 8,595,997 B2 * | 12/2013 | Wu | ......................... | F24J 2/5205 136/244 |
| 8,640,401 B2 * | 2/2014 | Hong | ...................... | F24J 2/5205 248/230.2 |
| 8,839,573 B2 * | 9/2014 | Cusson | ................... | F24J 2/5232 248/231.81 |
| D732,698 S * | 6/2015 | Meng | ............................. | D25/61 |
| 9,051,950 B2 * | 6/2015 | Jaffari | ..................... | F16B 2/065 |
| 9,057,542 B2 * | 6/2015 | Schuit | ..................... | F24J 2/5205 |
| 2003/0070368 A1 * | 4/2003 | Shingleton | ............. | F24J 2/5205 52/173.3 |
| 2003/0101662 A1 * | 6/2003 | Ullman | ................... | E04D 13/12 52/27 |
| 2003/0206785 A1 * | 11/2003 | Hoffmann | ............. | F16B 37/045 411/84 |
| 2006/0156651 A1 * | 7/2006 | Genschorek | ............. | F24J 2/045 52/200 |
| 2009/0232616 A1 * | 9/2009 | Sekreta | ................... | F16B 35/06 411/107 |
| 2010/0276558 A1 * | 11/2010 | Faust | ..................... | F24J 2/5205 248/222.14 |
| 2011/0120047 A1 * | 5/2011 | Stearns | ................... | E04D 13/10 52/698 |
| 2011/0138585 A1 * | 6/2011 | Kmita | ..................... | F24J 2/5258 24/522 |
| 2011/0179606 A1 * | 7/2011 | Magno, Jr. | ............. | F24J 2/5258 24/457 |
| 2011/0214365 A1 * | 9/2011 | Aftanas | .................. | F24J 2/5258 52/173.3 |
| 2012/0244729 A1 * | 9/2012 | Rivera | ................... | F24J 2/4638 439/97 |
| 2015/0102194 A1 * | 4/2015 | Liu | ........................ | F24J 2/5258 248/316.1 |

* cited by examiner

*Primary Examiner* — Monica Millner

(57) ABSTRACT

The invention discloses a guide rail for solar mounting, comprising a main body; the main body is provided with a first slotted rail on the top, a nut rail on one sidewall, and a second slotted rail on the other sidewall; the first slotted rail has an upward opening; the second slotted rail has an opening perpendicular to that of the first slotted rail and with the back against the main body; the nut rail has an opening perpendicular to that of the first slotted rail and with the back against the main body; the second slotted rail has an opening opposite to that of the nut rail. The guide rail for solar mounting can be fixed in diversified ways, i.e, by an outer-hexagonal part or a fixture block, meeting operating requirements under different conditions.

16 Claims, 7 Drawing Sheets

GUIDE RAIL FOR SOLAR MOUNTING

CROSS-REFERENCE TO RELATED APPLICATIONS

This present application claims the benefit of Chinese Patent Application No. 201510379785.2 filed on Jul. 1, 2015, the contents of which are hereby incorporated by reference.

FIELD OF THE INVENTION

The invention relates to the field of guide rail for bracket, in particular to a guide rail for solar mounting.

DESCRIPTION OF THE RELATED ART

Solar panel is the core in a solar power system, and is also the part with the highest value in the solar power system. The role of the solar panel is to convert the radiation energy from the sun into electric energy or send the electric energy to batteries for storage or drive loading. The solar panel is installed in the solar assembly, and the solar assembly is traditionally installed on the guide rail for solar mounting through a fixed part, which is quite complicated. With the popularization of solar power generation, the demand for solar mounting in the market, such as environmental protection, service life and the safety status on the roof, becomes higher and higher. Meanwhile, the single installation means is difficult to meet the operating requirements under different conditions.

SUMMARY OF THE INVENTION

The invention provides a guide rail for solar mounting to solve the problem of single installation means of guide rail for bracket in the prior art.

The invention further provides a fixture block used cooperatively with the guide rail for solar mounting to solve the problem that the fixture block cannot be earthed in the prior art.

The invention further provides a medium press block used cooperatively with the guide rail for solar mounting to solve the problems of material waste and inconvenient installation caused in puncturing on the back in the prior art.

The invention further provides a side press block used cooperatively with the guide rail for solar mounting to solve the problems of material waste and inconvenient installation caused in puncturing the back in the prior art.

The technical solution of the invention is realized by:

A guide rail for solar mounting, comprising a main body; the main body is provided with a first slotted rail on the top, a nut rail on one sidewall, and a second slotted rail on the other sidewall;

the first slotted rail has an upward opening;

the second slotted rail has an opening perpendicular to that of the first slotted rail and with the back against the main body;

the nut rail has an opening perpendicular to that of the first slotted rail and with the back against the main body;

and the second slotted rail has an opening opposite to that of the nut rail.

As a preferred technical solution, the main body, the first slotted rail, the nut rail and the second slotted rail are integrally formed.

As a preferred technical solution, the main body, the first slotted rail, the nut rail and the second slotted rail are of solid structure. The cross section of the guide rail is not provided with a mould cavity structure, which meets the strength requirement while saving material.

As a preferred technical solution, the edges of the openings of the first slotted guide rail and the second slotted rail are provided with rail strips toward the centers of the two slotted rails; the rail strip has certain included angle, less than 90°, with the sidewalls of the first slotted rail and the second slotted rail respectively, which achieves quick snap of the fixture block; the edges of the opening of the nut rail are provided with nut strips toward the center of the nut rail; and the nut strip is perpendicular to the sidewall of the nut rail.

As a preferred technical solution, a corrugated groove is arranged on the outer surface of the sidewall of the first slotted rail, which achieves the purpose of fastening while being used cooperatively with other parts. A corrugated groove is arranged on the surface of the nut strip, which achieves the purpose of fastening while being used cooperatively with other parts.

As a preferred technical solution, the guide rail for solar mounting is made of aluminum alloy.

As a preferred technical solution, the guide rail for solar mounting further comprises an earthed fixture block used cooperatively therewith;

the earthed fixture block comprises a fixture block body;

and a tip for puncturing the oxide membrane on the guide rail is arranged on the fixture block body.

As a preferred technical solution, the fixture block body is composed of a bottom face and four side faces; the side faces are arranged pairwise symmetrically; the two side faces that are arranged symmetrically are identical in shape; and tips for puncturing the oxide membrane on the guide rail are arranged on at least one pair of symmetrically arranged side faces;

and a hollow boss for fixing is arranged in the middle of the bottom face.

As a preferred technical solution, the connection between the bottom face and each side face has a curved transition.

As a preferred technical solution, tips for puncturing the oxide membrane on the guide rail are arranged on the tops of one pair of symmetrically arranged side faces of the fixture block body, and the other pair of symmetrically arranged side faces have planar tops.

As a preferred technical solution, the side faces with the planar tops are higher than the side faces provided with tips thereon.

As a preferred technical solution, the tips, identical in height, are regularly ranked on the tops of the side faces.

As a preferred technical solution, the number of the tips is more than two, which can improve the probability of puncturing oxide membrane and ensure that at least a tip can puncture the oxide membrane.

As a preferred technical solution, the guide rail for solar mounting further comprises an earthed side press block used cooperatively with the guide rail for solar mounting; the side press block is composed of a first panel, a second panel and a third panel;

the first panel is fixedly connected with the second panel, and the third panel is fixedly connected with the first panel;

the first, second and third panels form a "Z" shape;

at least a puncturing tip for puncturing the oxide membrane on the frame of a solar panel is arranged on the first panel;

and a through hole for fixing is arranged on the third panel.

As a preferred technical solution, at least two puncturing tips are arranged on the first panel, which can improve the probability of puncturing oxide membrane and ensure that at least a puncturing tip can puncture the oxide membrane.

As a preferred technical solution, the puncturing tips are embedded on the first panel and at the exterior of the first panel.

As a preferred technical solution, the first, second and third panels are integrally formed.

As a preferred technical solution, anti-skid lines are arranged on the bottom face of the first panel.

As a preferred technical solution, a gasket for puncturing the oxide membrane on the third panel is arranged at the connection between the through hole and a fixed block.

As a preferred technical solution, the gasket is composed of a plurality of sheets and a circular ring; the plurality of sheets are arranged on the perimeter of the circular ring and are ranked in circular array; the horizontal included angle between a sheet and the circular ring is 1°-5°.

As a preferred technical solution, the guide rail for solar mounting further comprises an earthed medium press block used cooperatively therewith, comprising a medium press block body;

the medium press block body comprises a first panel and a first bulge that is located in the middle of the first panel and is fixedly connected with the first panel;

a through hole penetrating the first bulge is arranged on the first panel;

and at least a puncturing tip for puncturing the oxide membrane on the frame of a solar panel is arranged on the first panel.

As a preferred technical solution, at least two puncturing tips are arranged on the first panel, which can improve the probability of puncturing oxide membrane and ensure that at least a puncturing tip can puncture the oxide membrane.

As a preferred technical solution, the two puncturing tips are symmetrically arranged on the first panel.

As a preferred technical solution, at least four puncturing tips are arranged on the first panel.

As a preferred technical solution, the four puncturing tips are arranged at four corners of the first panel.

As a preferred technical solution, the puncturing tips are embedded on the first panel and at the exterior of the first panel.

As a preferred technical solution, anti-skid lines are arranged on the first panel and are located at both sides of the first bulge.

As a preferred technical solution, the first panel and first bulge are integrally formed.

Compared with the prior art, the invention has the following beneficial effects:

(1) The guide rail for solar mounting can be fixed in diversified ways, i.e, by an outer-hexagonal part or a fixture block, meeting operating requirements under different conditions.

(2) The cross section of the guide rail is not provided with a mould cavity structure, which meets the strength requirement while saving material. The guide rail is proper in design and stable in structure.

(3) A fixture block is arranged with tips, so that the fixture block, on the surface contacting the guide rail, can puncture the oxide membrane on the surface of the guide rail, which achieves earthing, higher safety and more convenient installation and application.

(4) The puncturing tips of the side/medium press block achieve puncturing the front without adding disposable sheet parts for puncturing the back, which reduces material waste.

In addition, the puncturing tip is embedded on the side press block and can be used repeatedly, which makes the tip uneasy to damage, and makes installation more convenient and simple. The earthed side press block is used cooperatively with the gasket, which achieves integral earthing and largely improves safety of equipment. Meanwhile, anti-skid lines are arranged, so that the earthed side press block is fixed more firmly.

BRIEF DESCRIPTION OF THE DRAWINGS

In order to clearly describe the embodiments of the invention or the technical solutions in the prior art, the embodiments or drawings used in technical description will be simply introduced below. Apparently, the drawings described below are only some embodiments of the invention. A person skilled in the art can obtain other drawings based on these drawings without creative work.

Wherein:

1, guide rail for solar mounting; 11, main body; 12, first slotted rail; 13, nut rail; 14, second slotted rail; 15, rail strip; 16, nut strip;

2, fixture block body; 21, bottom face; 22, first side face; 23, second side face; 24, third side face; 25, fourth side face; 26, first tip; 27, hollow boss; 28, fixed block; 29, gasket;

3, side press block; 31, first panel; 32, second panel; 33, third panel; 34, puncturing tip; 35, first through hole; 29, gasket; 291, circular ring; 292, sheet; 36, anti-skid line;

4, medium press block body; 41, panel; 42, first bulge; 44, second through hole;

5, connecting piece; 51, panel; 52, slot opening; 511, fixing piece.

DESCRIPTION OF THE PREFERRED EMBODIMENT

The technical solution in the embodiments of the invention will be described clearly and completely below. Apparently, the embodiments described are only some embodiments of the invention, not all embodiments. Based on the embodiments of the invention, all other embodiments obtained by a person skilled in the art without creative work will fall within the protection scope of the invention.

Figure 1:
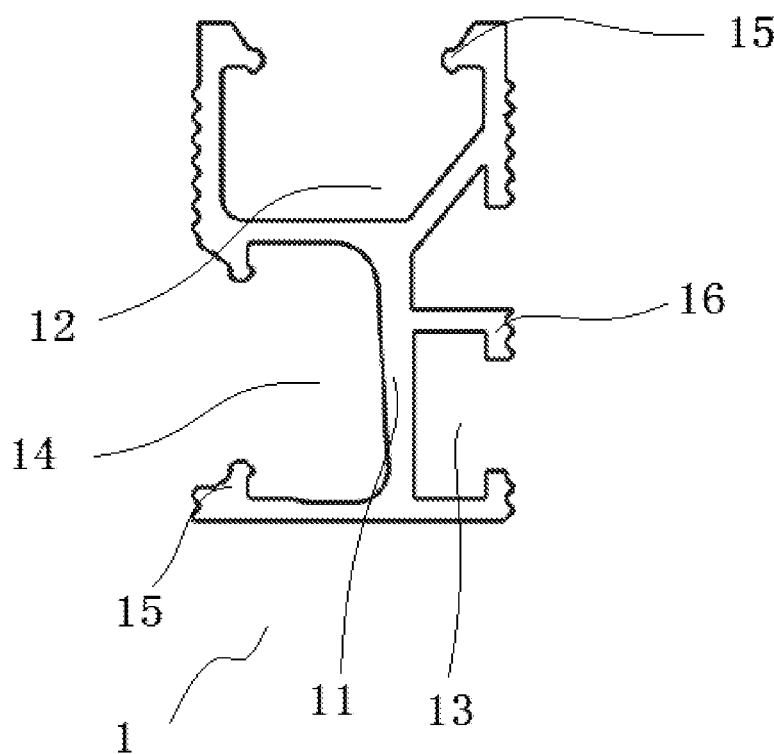
FIG. 1 is the structural diagram 1 of the guide rail for solar mounting of the invention.
Figure 2:
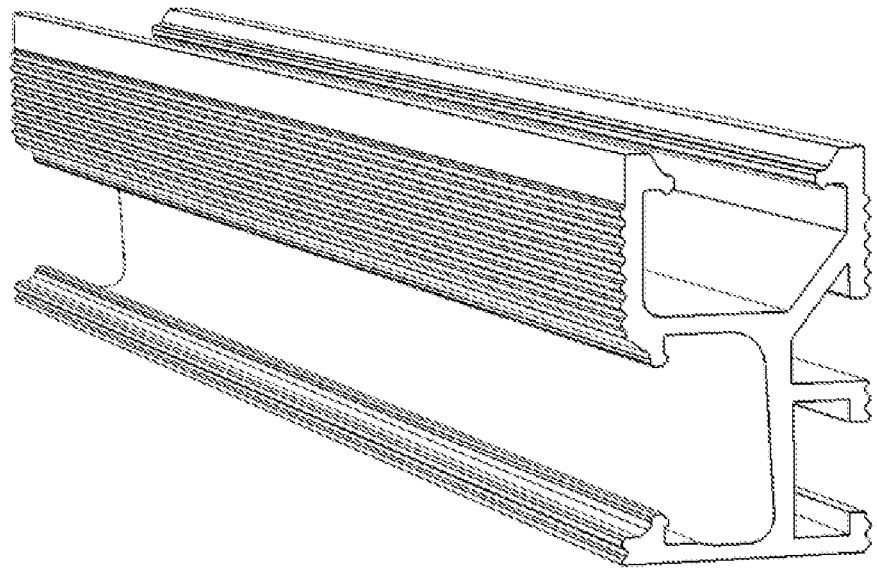
FIG. 2 is the structural diagram 2 of the guide rail for solar mounting of the invention.

As shown in FIG. 1 and FIG. 2, a guide rail for solar mounting 1 is composed of a main body 11, a first slotted rail 12, a nut rail 13 and a second slotted rail 14. Wherein, the main body 11 is provided with the first slotted rail 12 on the top. The main body 11 is provided with the nut rail 13 on one sidewall, and the second slotted rail 14 on the other sidewall. Wherein, one edge of the second slotted rail 14 and one edge of the nut rail 13 overlap with the main body 11. The first slotted rail 12 has an upward opening. The second slotted rail 14 has an opening perpendicular to that of the first slotted rail 12 and with the back against the main body 11. The nut rail 13 has an opening perpendicular to that of the first slotted rail 12 and with the back against the main body 11. The second slotted rail 14 has an opening opposite to that of the nut rail 13. Wherein, the cross section of the guide rail for solar mounting 1, composed of the main body 11, first slotted rail 12, nut rail 13 and second slotted rail 14, is approximately rectangular. The guide rail for solar mounting 1 is made of aluminum alloy, characterized by environmental protection, long service life and light weight, and can meet the maximum safety status of the solar mounting installed on the roof.

The main body 11, first slotted rail 12, nut rail 13 and second slotted rail 14 of the invention are integrally formed, which can improve the strength of the guide rail and facilitate installation.

In order to save material and meet the requirement for strength of the guide rail, the main body 11, first slotted rail 12, nut rail 13 and second slotted rail 14 are all of solid structure. The cross section of the guide rail is not provided with a mould cavity structure.

In order to facilitate installation, the edges of the openings of the first slotted guide rail 12 and the second slotted rail 14 are provided with rail strips 15 toward the center of the two slotted rails; the rail strip 15 has certain included angle, less than 90°, with the sidewalls of the first slotted rail 12 and the second slotted rail 14 respectively, which achieves quick snap of the fixture block; the edge of the opening of the nut rail 13 is provided with a nut strip 16 toward the center of the nut rail 13; and the nut strip 16 is perpendicular to the sidewall of the nut rail 13.

In order to fasten better, a corrugated groove is arranged on the outer surface of the sidewall of the first slotted rail 12, which achieves the purpose of fastening when the first slotted rail 12 is used cooperatively with other parts. A corrugated groove is arranged on the surface of the nut strip 16, which achieves the purpose of fastening when the nut rail 16 is used cooperatively with other parts.

Figure 3:
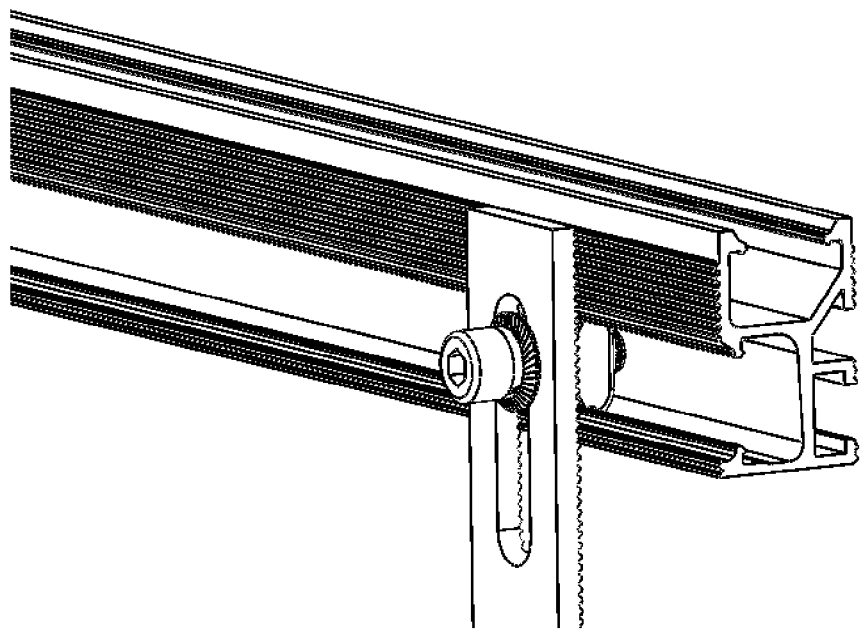
FIG. 3 is the reference diagram 1 for application of the guide rail for solar mounting of the invention.
Figure 4:
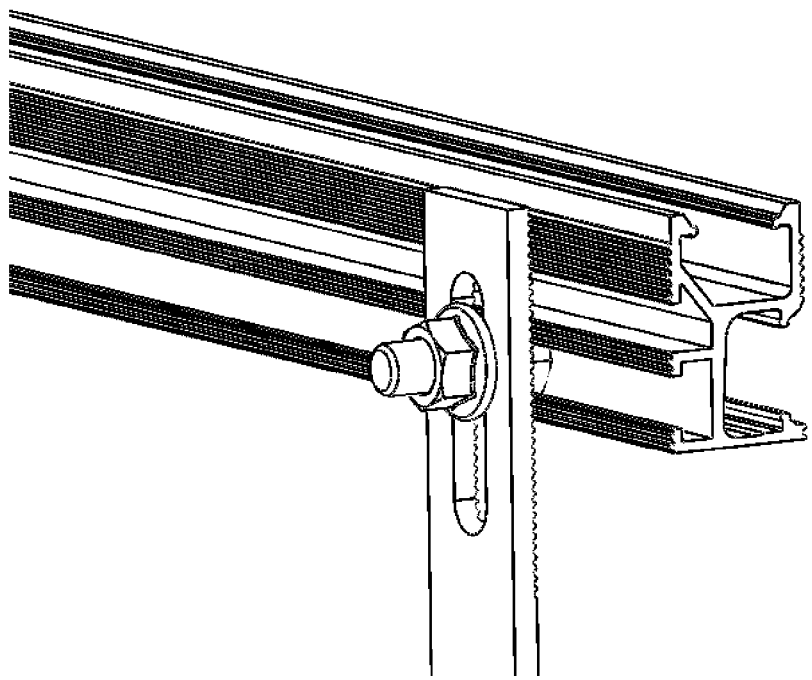
FIG. 4 is the reference diagram 2 for application of the guide rail for solar mounting of the invention.

FIG. 3 is the schematic diagram of the fixture block installed in the guide rail for solar mounting. FIG. 4 is the schematic diagram of the outer-hexagonal part installed in the guide rail for solar mounting. From FIG. 3 and FIG. 4 it can be known that the guide rail can solve the fixing problem in different states, is installed flexibly, and is stable in structure.

Figure 5:
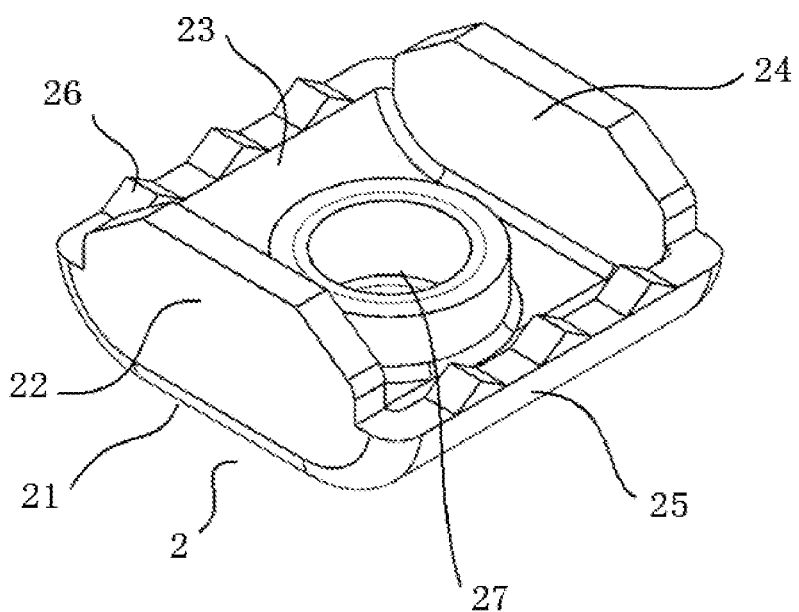
FIG. 5 is a structural diagram of the fixture block used cooperatively with the guide for solar mounting of the invention.

The shape of the fixture block is not restricted in the invention, as long as the fixture block can be applied in the guide rail. For example, a plane is provided with a tip 26, capable of puncturing the oxide membrane on the guide rail, on the face contacting the guide rail, which can achieve the earthing function. An earthed fixture block with a new shape will be described as follows, and the fixture block with the new shape is a preferred structure applied in the guide rail, but not to limit the scope of the invention. As shown in FIG. 5, the fixture block comprises a fixture block body 2 that is composed of a bottom face 21 and four side faces. The four side faces are first side face 22, second side face 23, third side face 24 and fourth side face 25 respectively, wherein the bottom face 21 and the four side faces are integrally formed, and the both bottom face and the side faces are made of stainless steel material. The side faces are arranged pairwise symmetrically; the two side faces that are arranged symmetrically are identical in shape, that is, tips 26 for puncturing the oxide membrane on the guide rail are arranged on at least one pair of symmetrically arranged side faces. In the embodiment, the first side face 22 and the third side face 24 are selected to provide with first tips 26 respectively. For another pair of side faces, the second side face 23 and the fourth side face 25 have planar tops. The role of the tip 26 is to puncture the oxide membrane on the guide rail during installation to achieve earthing and improving safety. Therefore, in order to ensure that at least one first tip 26 can puncture the oxide membrane, more than two first tips 26 are arranged. In the embodiment, three first tips 26 identical in height are arranged and regularly ranked on the tops of the first side face 22 and the third side face 24. In order to facilitate installation of the fixture block, the second side face 23 and the fourth side face 25 are higher than the first side face 22 and the third side face 24. In the embodiment, the connection between the bottom face 21 and each side face has a curved transition, which is also used to facilitate installation. A hollow boss 27 for fixing is arranged in the middle of the bottom face 21, wherein the hollow boss 27 is provided with internal threads, and the fixture block is connected with other spare parts through the hollow boss 27. In the process of fixing, the guide rail is punctured by the side face with the first tip 26, which achieves the earthing function, so that equipment is installed more conveniently and safely.

Figure 6:
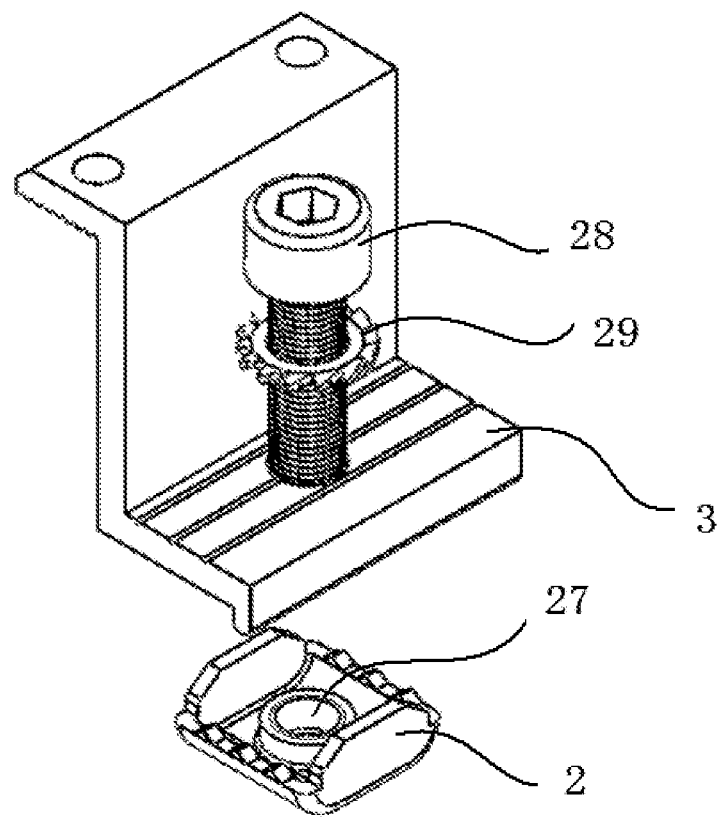
FIG. 6 is the reference diagram 1 for application of the fixture block shown in FIG. 5.

FIG. 6 is the reference diagram 1 for application of the fixture block.

A bolt passes through the hollow boss 27 and the side press block 3. A fixed block 28 is connected with the side press block 3 through the bolt, and a gasket 29 for puncturing the oxide membrane on the side press block 3 is provided between the fixed block 28 and the side press block 3, thus achieving integral earthing.

Figure 7:
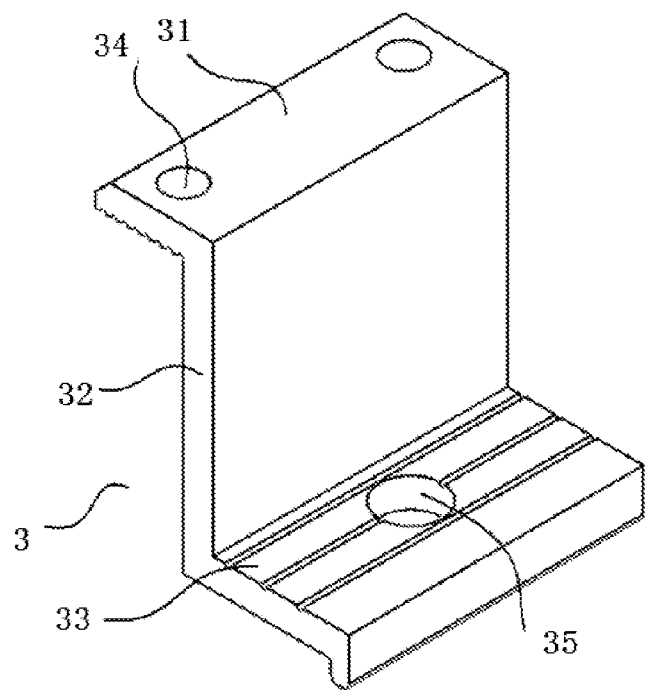
FIG. 7 is the structural diagram 1 of the side press block used cooperatively with the guide rail for solar mounting of the invention.
Figure 8:
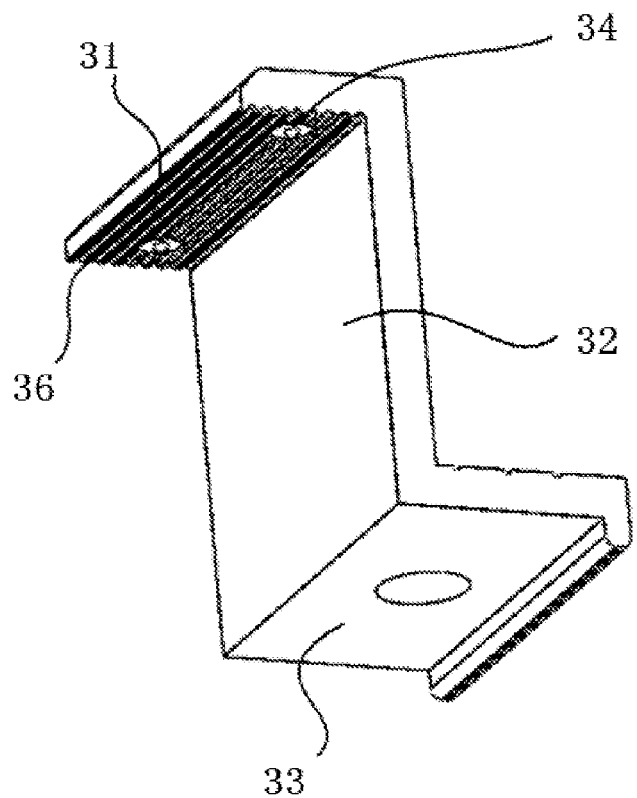
FIG. 8 is the structural diagram 2 of the side press block used cooperatively with the guide rail for solar mounting of the invention.
Figure 9:
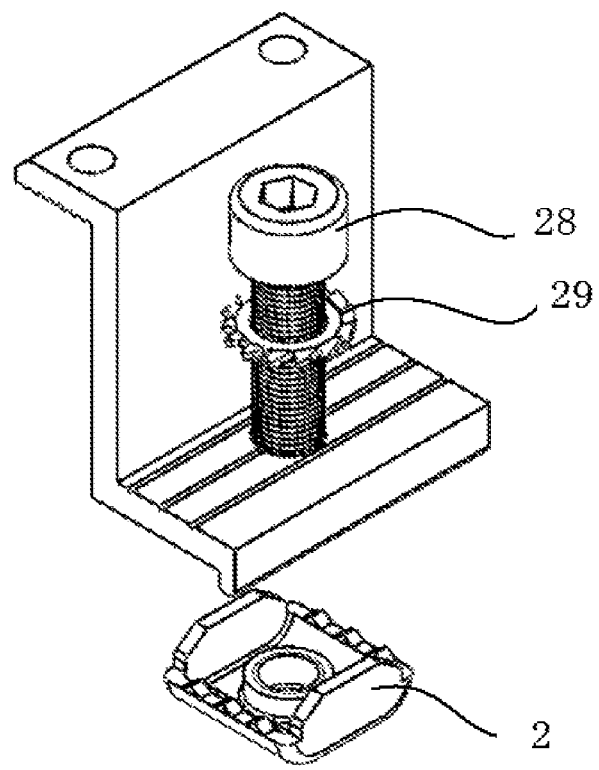
FIG. 9 is the reference diagram for application of the side press block shown in FIG. 7.
Figure 10:
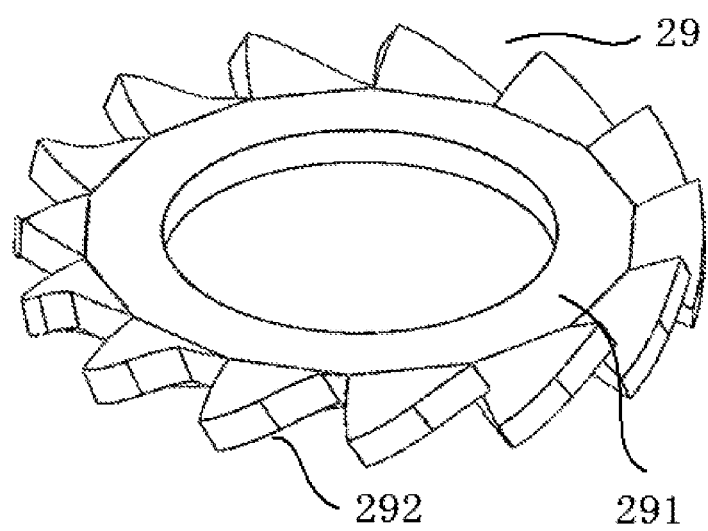
FIG. 10 is the structural diagram of the gasket used cooperatively with the side press block shown in FIG. 7.

As shown in FIG. 7, the side press block 3 is composed of a first panel 31, a second panel 32 and a third panel 33. The first panel 31 is fixedly connected with the second panel 32, and the third panel 33 is fixedly connected with the first panel 31. The first panel 31, second panel 32 and third panel 33 form a "Z" shape. In the embodiment, the first panel 31, second panel 32 and third panel 33 are integrally formed. In order to increase the application frequency of the side press block and reduce material waste, at least a puncturing tip 34 for puncturing the oxide membrane on the frame of a solar panel is provided on the first panel 31, and the puncturing tip 34 is made of stainless steel material. As shown in FIG. 8, the puncturing tip 34 is embedded on the first panel 31 with a tip provided at the exterior of the first panel 31, so that the puncturing tip 34, when the side press block 3 is used, can contact the frame of the solar panel to puncture the oxide membrane on the frame of the solar panel, and then is earthed. The improvement is that: the form of puncturing of oxide membrane on the back in the previous art is changed into the form of puncturing oxide membrane on the front in the invention, which reduces the original sheet parts for puncturing oxide membrane on the back. The original sheet part for puncturing the back deforms after one time of application and cannot be used repeatedly, which results in material waste. The invention is of puncturing the front, a puncturing tip 34 is provided on the first panel 31 of the side press block 3, which reduces the application frequency of sheet parts, saves material and reduces waste caused by sheet parts that are discarded upon one time of application. The puncturing tip can be used repeatedly, and is convenient for installation and application. Meanwhile, in order to improve the effect of puncturing the front and prevent unavailable earthing problem caused by deformed solar panel, at least two puncturing tips 34 are provided on the first panel 31. In the embodiment, two puncturing tips are selected. Of course, a person skilled in the art can set three or more puncturing tips 34 according to the actual conditions. A first through hole 35 for fixing is provided on the third panel 33. As shown in FIG. 9 and FIG. 10, FIG. 9 is the reference diagram for application of the side press block 3. a bolt passes through the first through hole 35, and is fixedly connected with the first through hole 35. The fixed block 28 is connected with the third panel 33 through a bolt, and a gasket 29 for puncturing the oxide membrane on the third panel 33 is provided between the fixed block 28 and the third panel 33, thus achieving integral earthing. A fixture block 2 is provided below the bolt. Wherein, the gasket 29 is provided with a tip capable of puncturing the oxide membrane. A person skilled in the art can design gaskets with different shapes according to the puncturing effect. The gasket 29 used in the embodiment is composed of a circular ring 291 and a plurality of sheets 292 that are provided on the perimeter of the circular ring 291 and ranked in circular array. The horizontal included angle between the sheet 292 and the circular ring 291 is 1°-5°. For fixing the earthed side press block 3 on the frame of the solar panel better, anti-skid lines 36 are provided at the place where the side press block 3 contacts the frame of the solar panel.

Figure 11:
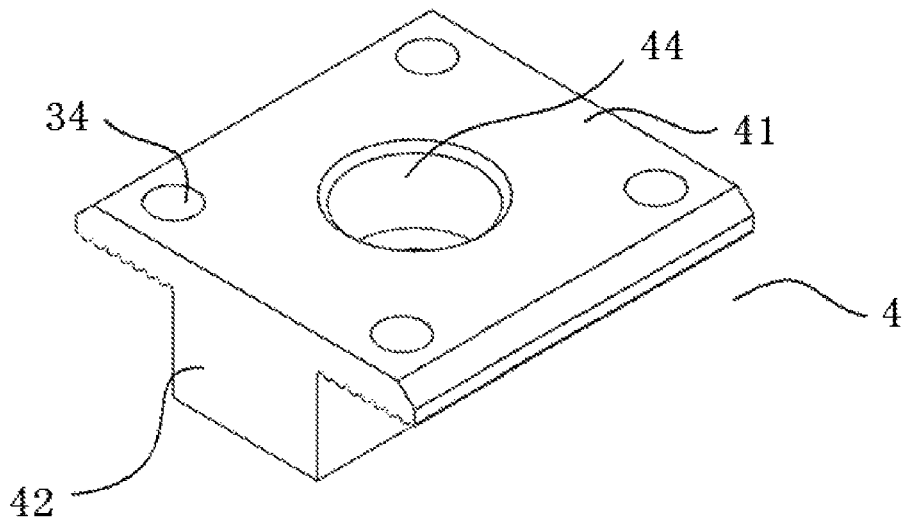
FIG. 11 is the structural diagram of the medium press block used cooperatively with the guide rail for solar mounting of the invention.

As shown in FIG. 11, a medium press block comprises a medium press block body 4. The medium press block body 4 comprises a panel 41 and a first bulge 42 that is located in the middle of the panel 41 and is fixedly connected with the panel 41. The first bulge 42 is identical with the panel 41 in terms of longitudinal length. The panel 41 and the first bulge 42 in the embodiment are integrally formed, and both are made of stainless steel material. In order to increase the application frequency of the medium press block and reduce material waste, at least a puncturing tip 34 for puncturing the oxide membrane on the frame of the solar panel is provided on the panel 41. The puncturing tip 34 is embedded on the panel 41 and at the exterior of the panel 41, so that the puncturing tip 34, when the medium press block is used, can contact the frame of the solar panel to puncture the oxide membrane on the frame of the solar panel, and then is earthed. The puncturing tip 34 fixed on the medium press block is in interference fit. In the invention, puncturing the front is used, and the puncturing tip 34 is provided on the panel 41 of the medium press block directly, which reduces the application frequency of sheet parts, saves material and reduces waste caused by sheet parts that are discarded upon one time of application. The puncturing tip can be used repeatedly, and is convenient for installation and application. Meanwhile, in order to improve the effect of puncturing the front and prevent unavailable earthing problem caused by deformed solar panel, at least two puncturing tips 34 are provided on the panel 41. Two puncturing tips 34 are symmetrically provided on the panel 41, so that the medium press block can be fixed stably. As from FIG. 11, it is known that the panel 41 is nearly square, four puncturing tips 34 are selected in the embodiment and are provided at four corners of the panel 41, which can better ensure that four corners of the panel 41 contact the frame of the solar panel stably. Of course, a person skilled in the art can set six or more puncturing tips 34 according to the actual conditions. For installing the medium press block body 4, a second through hole 44 penetrating the first bulge 42 is provided on the panel 41.

Figure 12:
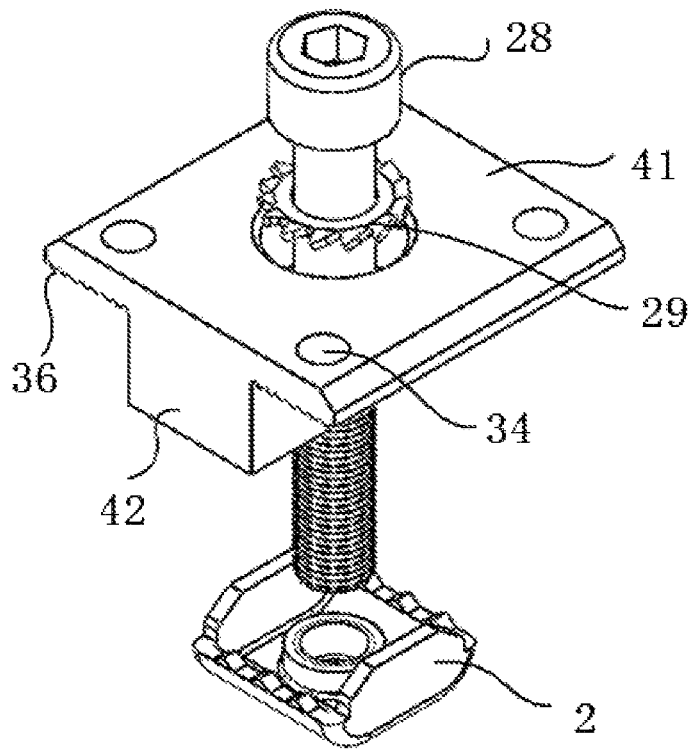
FIG. 12 is the reference diagram for application of the medium press block shown in FIG. 11.

As shown in FIG. 12, FIG. 12 is the reference diagram for application of the earthed medium press block. A bolt passes through the second through hole 44, and is fixedly connected with the second through hole 44. The fixed block 28 is connected with the medium press block body 4 through the bolt, and a gasket 29 for puncturing the oxide membrane on the panel 41 is provided between the fixed block 28 and the medium press block body 4, thus achieving integral earthing. A fixture block 1 is provided below the bolt. Wherein, the gasket 29 is provided with a tip capable of puncturing the oxide membrane. A person skilled in the art can design gaskets with different shapes according to the puncturing effect. For fixing the earthed medium press block on the frame of the solar panel better, anti-skid lines 36, located at both sides of the first bulge, are provided at the place where the medium press block contacts the frame of the solar panel.

Figure 13:
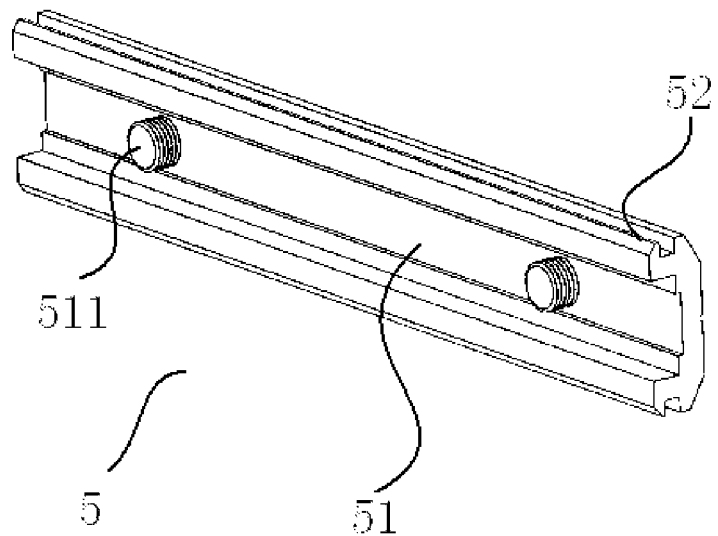
FIG. 13 is the structural diagram showing the connecting piece and the fixed part for the guide rail for solar mounting of the invention that are combined.

The connecting piece between the guide rails for solar mounting is shown in FIG. 13.

The guide rails for solar mounting as shown in FIG. 2 shall be connected together through the connecting piece as shown in FIG. 13. In order to ensure integral earthing of the guide rails for solar mounting, the functional requirement for the connecting piece is very high.

As shown in FIG. 13, the connecting piece 5 is composed of a panel 51 and a slot opening 52 matched with the nut rail 13 as shown in FIG. 1. A through hole for a fixed part 511 is provided on the panel. In general, two through holes are provided and are distributed at both ends of the panel 51. A person skilled in the art can also provide more than two through holes according to the demand, so that the fixed part is fixed more firmly.

Figure 14:
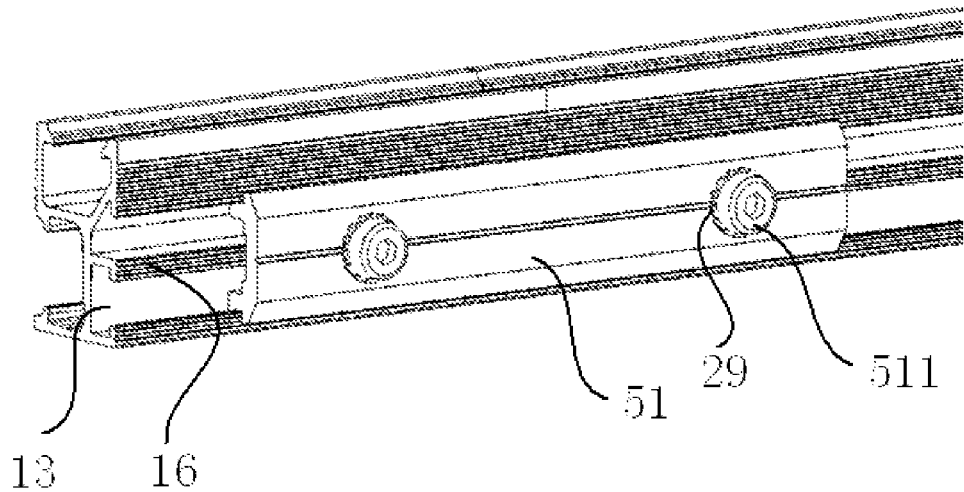
FIG. 14 is the reference diagram for application of the connecting piece shown in FIG. 13.

The operation steps include:

Connecting the connecting piece 5 together with two guide rails for solar mounting; placing the gasket 29 between the panel 51 and the fixed part 511; and tightening the fixed part 511 forcibly, so that the bottom of the fixed part 511 withstands the nut strip 16. When the fixed part 511 contacts the nut strip 16, the oxide membrane on the surface of the nut strip 16 will be punctured in the tightening process because of the effect of forces, thus achieving the function of earthing between the guide rails for solar mounting that are connected. Two solar mountings connected are shown in FIG. 14.

The above are only preferred embodiments of the invention and not to limit the invention. Any modification, equivalent replacement and improvement made within the range of the spirit and rule of the invention shall fall within the protection scope of the invention.

What is claimed is:

1. A guide rail for solar mounting, comprising a main body, wherein the main body is provided with a first slotted rail on the top, a nut rail on one sidewall, and a second slotted rail on the other sidewall;

the first slotted rail has an upward opening;

the second slotted rail has an opening perpendicular to that of the first slotted rail and with the back against the main body;

the nut rail has an opening perpendicular to that of the first slotted rail and with the back against the main body; and the second slotted rail has an opening opposite to that of the nut rail;

further comprising an earthed fixture block used cooperatively with the guide rail for solar mounting, wherein the earthed fixture block comprises a fixture block body; and a tip for puncturing the oxide membrane on the guide rail is arranged on the fixture block body;

wherein the fixture block body is composed of a bottom face and four side faces; the side faces are arranged pairwise symmetrically; the two side faces that are arranged symmetrically are identical in shape; and at least two tips for puncturing the oxide membrane on the guide rail are arranged on at least one pair of symmetrically arranged side faces; and a hollow boss for fixing is arranged in the middle of the bottom face;

wherein tips for puncturing the oxide membrane on the guide rail are arranged on the tops of one pair of symmetrically arranged side faces of the fixture block body, and the other pair of symmetrically arranged side faces have planar tops;

wherein the tips, identical in height, are regularly uniform ranked on the tops of the side faces.

2. The guide rail for solar mounting according to claim 1, wherein the main body, the first slotted rail, the nut rail and the second slotted rail are integrally formed.

3. The guide rail for solar mounting according to claim 1, wherein the main body, the first slotted rail, the nut rail and the second slotted rail are of solid structure.

4. The guide rail for solar mounting according to claim 1, wherein edges of the openings of the first slotted guide rail and the second slotted rail are provided with rail strips toward the centers of two slotted rails; the rail strip has certain included angle, less than 90°, with sidewalls of the first slotted rail and the second slotted rail respectively; the edges of the opening of the nut rail are provided with nut strips toward center of the nut rail; and the nut strip is perpendicular to sidewall of the nut rail.

5. The guide rail for solar mounting according to claim 1, wherein a corrugated groove is arranged on the outer surface of the sidewall of the first slotted rail, and a corrugated groove is arranged on the surface of the nut strip.

6. The guide rail for solar mounting according to claim 1, wherein the connection between the bottom face and each side face has a curved transition.

7. The guide rail for solar mounting according to claim 1, wherein the side faces with the planar tops are higher than the side faces provided with tips thereon.

8. The guide rail for solar mounting according to claim 1, wherein the number of the tips is more than two.

9. The guide rail for solar mounting according to claim 1, further comprising an earthed side press block used cooperatively with the guide rail for solar mounting, wherein the side press block is composed of a first panel, a second panel and a third panel;

the first panel is fixedly connected with the second panel, and the third panel is fixedly connected with the second panel;

the first, second and third panels form a "Z" shape;

at least a puncturing tip for puncturing the oxide membrane on the frame of a solar panel is arranged on the first panel; and a through hole for fixing is arranged on the third panel.

10. The guide rail for solar mounting according to claim 9, wherein at least two puncturing tips are arranged on the first panel;

the puncturing tips are embedded on the first panel and at the exterior of the
first panel; and the first, second and third panels are integrally formed.

11. The guide rail for solar mounting according to claim 9, wherein a gasket for puncturing the oxide membrane on the third panel is arranged at the connection between the through hole and a fixed block; the gasket is composed of a plurality of sheets and a circular ring; the plurality of sheets are arranged on the perimeter of the circular ring and are ranked in circular array; and the horizontal included angle between a sheet and the circular ring is 1°-5°.

12. The guide rail for solar mounting according to claim 1, further comprising an earthed medium press block used cooperatively with the guide rail for solar mounting, the earthed medium press block comprising a medium press block body, wherein the medium press block body comprises a first panel and a first bulge that is located in the middle of the first panel and is fixedly connected with the first panel;

a through hole penetrating the first bulge is arranged on the first panel; and at least a puncturing tip for puncturing the oxide membrane on the frame of a solar panel is arranged on the first panel.

13. The guide rail for solar mounting according to claim 12, wherein at least two puncturing tips are arranged on the first panel.

14. The guide rail for solar mounting according to claim 13, wherein the two puncturing tips are symmetrically arranged on the first panel.

15. The guide rail for solar mounting according to claim 13, wherein at least four puncturing tips are arranged at four corners of the first panel.

16. The guide rail for solar mounting according to claim 13, wherein the first panel and the first bulge are integrally formed.

* * * * *